(12) United States Patent
Moore

(10) Patent No.: US 7,779,788 B2
(45) Date of Patent: Aug. 24, 2010

(54) ANIMAL TRAINING SYSTEM WITH MULTIPLE CONFIGURABLE CORRECTION SETTINGS

(75) Inventor: William P. Moore, Fort Wayne, IN (US)

(73) Assignee: Radio Systems Corporation, Knoxville, TN (US)

(*) Notice: Subject to any disclaimer, the term of this patent is extended or adjusted under 35 U.S.C. 154(b) by 1062 days.

(21) Appl. No.: 11/442,837

(22) Filed: May 30, 2006

(65) Prior Publication Data
US 2007/0277749 A1    Dec. 6, 2007

(51) Int. Cl.
*A01K 29/00* (2006.01)
(52) U.S. Cl. ...................................... 119/721
(58) Field of Classification Search ......... 119/718–721; 340/573.1–573.3
See application file for complete search history.

(56) References Cited

U.S. PATENT DOCUMENTS

| | | | | |
|---|---|---|---|---|
| 5,606,936 A * | 3/1997 | Davis | ..................... | 119/721 |
| 5,787,841 A | 8/1998 | Titus et al. | ................ | 119/721 |
| 5,844,489 A | 12/1998 | Yarnall, Jr. et al. | .......... | 340/573 |
| 6,151,276 A | 11/2000 | Peinetti | ..................... | 367/139 |
| 6,166,643 A * | 12/2000 | Janning et al. | ........... | 340/573.3 |
| 6,170,439 B1 * | 1/2001 | Duncan et al. | ............. | 119/720 |
| 6,191,693 B1 | 2/2001 | Sangsingkeow | .......... | 340/573.3 |
| 6,360,698 B1 * | 3/2002 | Stapelfeld et al. | .......... | 119/720 |
| 6,433,671 B1 * | 8/2002 | Nysen | .................... | 340/10.41 |
| 6,467,435 B2 * | 10/2002 | Stapelfeld et al. | .......... | 119/720 |
| 6,600,422 B2 | 7/2003 | Barry et al. | .............. | 340/573.3 |
| 6,657,544 B2 | 12/2003 | Barry et al. | .............. | 340/573.3 |
| 6,788,199 B2 | 9/2004 | Crabtree et al. | ........ | 340/539.13 |
| 2001/0035134 A1 | 11/2001 | Stapelfeld et al. | .......... | 119/720 |
| 2001/0042522 A1 | 11/2001 | Barry et al. | ................ | 119/721 |
| 2003/0034887 A1 | 2/2003 | Crabtree et al. | ............. | 340/539 |

* cited by examiner

*Primary Examiner*—Thomas Price
(74) *Attorney, Agent, or Firm*—Pitts & Brittian, PC

(57) ABSTRACT

A receiver for an animal training system which includes a stimulation unit for providing at least one stimulus having a quantity of energy pulses and a stimulus pulse width; and a controller connected to the stimulation unit. The controller receives at least one transmitted signal and assigns amplitude information and rate information to at least one correction signal. The stimulation unit receives the at least one correction signal and outputs a corresponding stimulus having the quantity of energy pulses corresponding to the rate information. The stimulus has the stimulus pulse width corresponding to the amplitude information.

10 Claims, 11 Drawing Sheets

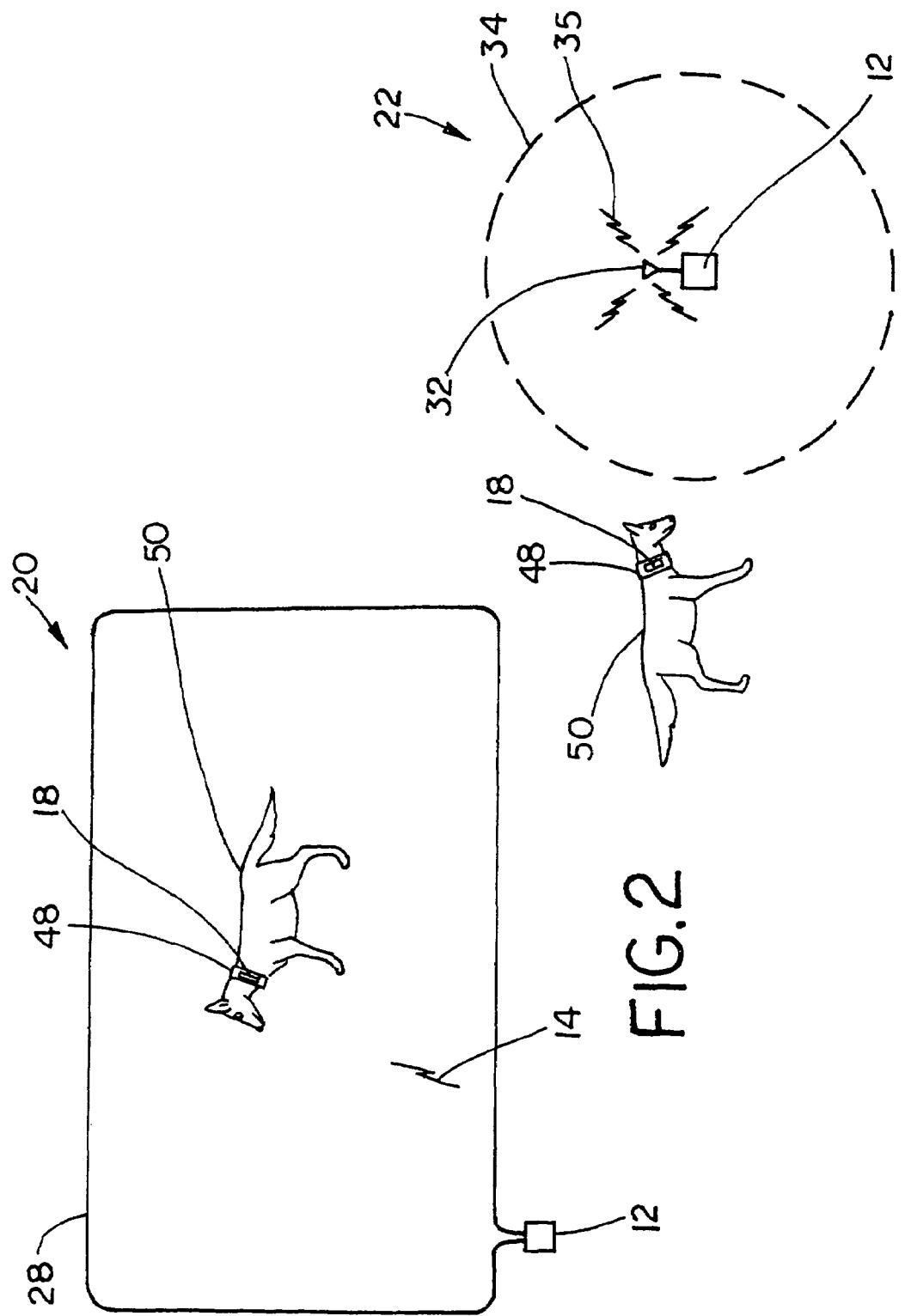

| Stim Level (amp x rate) | Number of Shock Pulses | $V_s$ (±100v) | (Flyback Voltage) $V_{fb}$, Volts (±1000V) | (Flyback Pulse Width) $T_a$, μsec (±200μsec) | (Shock Period) $T_b$ (msec) (±1msec) | (Total Shock Time) $T_c$ (msec) (±10 msec) | (Shock Packet Period) $T_d$ (msec) (±20msec) | (On Time) $T_e$ (μsec) (±5μsec) | Supply Current first beep (±10mA) | Supply Current add beep (±10mA) |
|---|---|---|---|---|---|---|---|---|---|---|
| HP Probe (500MOhm, 3 pf load) | | | | | | | | | | |
| 1x1 | 1 | 1.85k* | 3k | 22* | n/a | n/a | 360* | 30 | 45 | 25 |
| 2x1 | 1 | 1.85k* | 4.5k | 22* | n/a | n/a | 360* | 45 | 46 | 26 |
| 3x2 | 3 | 1.85k* | 5.7k | 22* | 87 | 175 | 360* | 60 | 50 | 33 |
| 4x3 | 5 | 1.85k* | 7k | 22* | 52 | 210 | 375* | 80 | 63 | 47 |
| 5x4 | 7 | 1.85k* | 6.88k | 22* | 38 | 224 | 375* | 100 | 86 | 77 |
| 5x5 | 10 | 1.85k* | 6.56k | 22* | 26 | 237 | 375* | 100 | 102 | 99 |
| (10K Ohm load) | | | | | | | | | | |
| 1x1 | 1 | 530 | 60* | 575 | n/a | n/a | 360* | 30 | 48 | 27 |
| 2x1 | 1 | 535 | 100* | 550 | n/a | n/a | 360* | 45 | 50 | 30 |
| 3x2 | 3 | 540 | 138* | 500 | 87 | 175 | 360* | 60 | 61 | 48 |
| 4x3 | 5 | 545 | 144* | 525 | 52 | 210 | 375* | 80 | 85 | 78 |
| 5x4 | 7 | 550 | 153* | 500 | 38 | 224 | 375* | 100 | 104 | 102 |
| 5x5 | 10 | 550 | 150* | 500 | 26 | 237 | 375* | 100 | 106 | 105 |

* NOMINAL

Fig. 10

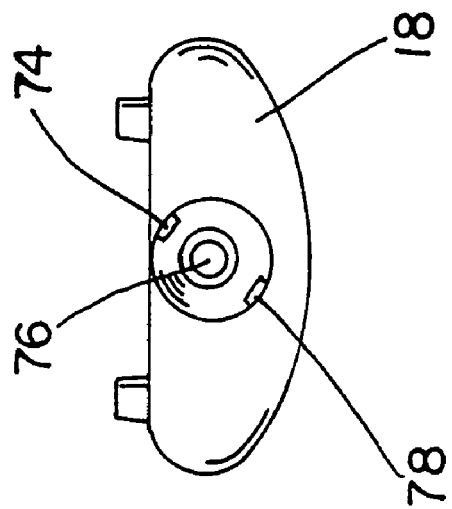
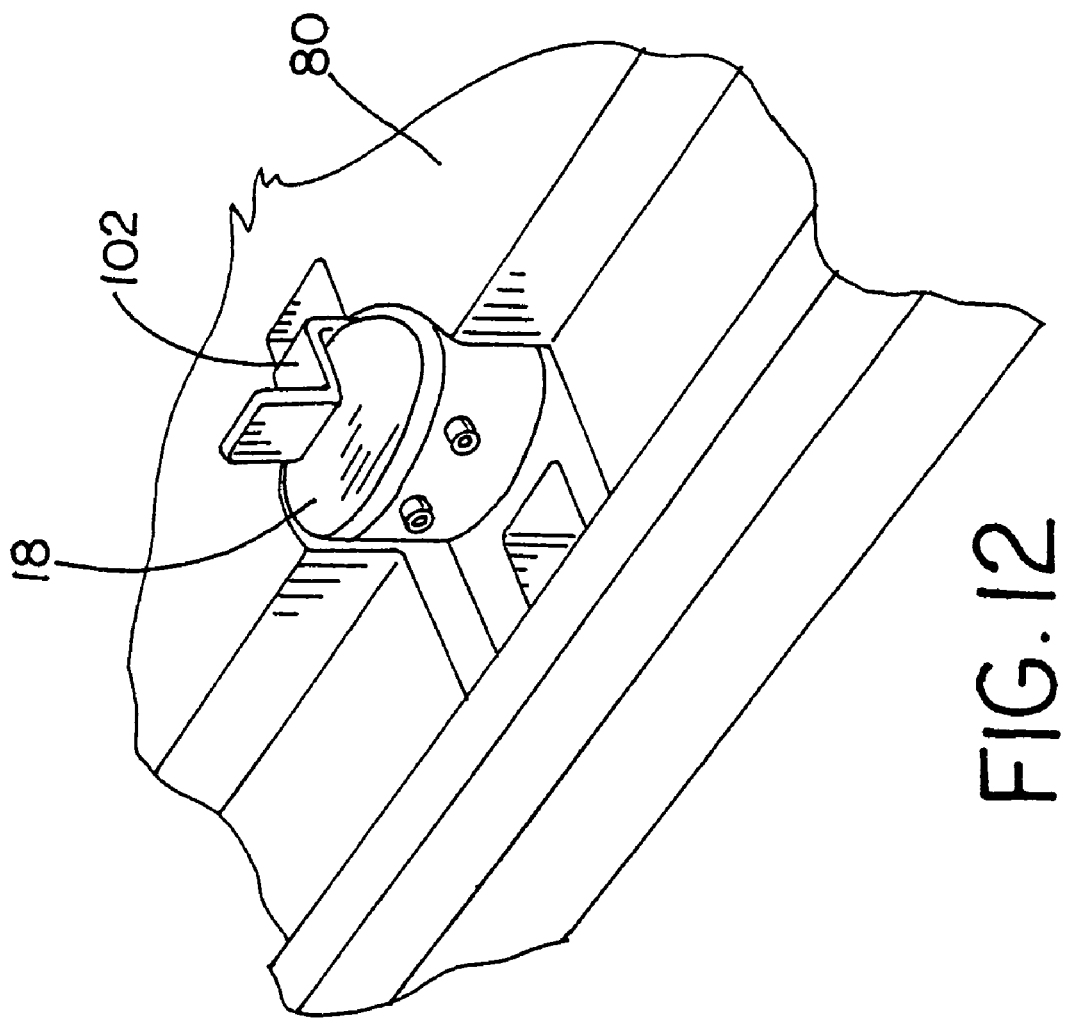

ANIMAL TRAINING SYSTEM WITH MULTIPLE CONFIGURABLE CORRECTION SETTINGS

BACKGROUND OF THE INVENTION

1. Field of the Invention

The present invention relates to animal training systems, and, more particularly, to an animal training collar and receiver with multiple configurable correction settings.

2. Description of the Related Art

Stimulus collars for animal training, particularly dog training, are known which can provide a variety of stimuli to the animal to encourage a trained response by the animal, and/or to discourage an inappropriate response. Such stimuli can include electrical, sound and vibrational stimuli, for example. In the case of an electrical stimulus, a collar worn receiver typically includes a pair of electrodes which can deliver the electrical stimulus to a dog's neck. The receiver energizes the electrodes responsive to a transmitter. Examples of such a transmitter can include a remote training transmitter hand operated by a human trainer, a containment transmitter and an avoidance transmitter. For a bark control collar, a collar worn receiver may receive audio or vibration signals from a microphone or transducer attached or connected to the receiver unit or the collar.

When activated by an appropriate signal from a corresponding transmitter or transducer, electrical stimulation is provided to a dog, for example, through the collar worn receiver electrodes which are in contact with some part of the dog's neck. In order to accommodate differences between breeds, individual dog temperament, training conditions, etc., it is advantageous to provide a wide range of possible stimulation, which range is selectable by the trainer. For example, the general difference in coat/skin of one breed versus another breed may provide a general difference in contact resistance, which can generally make a given breed more correctable at a lower electrical stimulation than another breed which has a thicker coat with a downy underlayer, for example. Further, a relatively strong willed dog may require more stimulation for a given training condition than a more amenable dog. Additionally, training conditions can inherently require different degrees of correction. For example, the correction level required by a containment system may inherently be relatively high because, if the animal were to leave the containment area, the animal may pose a risk to itself or others; whereas, an animal entering an avoidance zone, such as a couch inside a home, may only pose an inconvenience or nuisance.

Although the proper use of such electronic collars is a very effective, efficient, and humane way to train or control dogs (or other animals such as monkeys and horses) for a variety of purposes such as: containment in a specified area without the use of physical barriers, avoidance of specific areas, general obedience, bark control, performance trials, hunting, herding, and police work; to be most effective and humane, it is important that electronic stimulus collars are able to reliably and consistently apply an appropriate degree of stimulus to a wide variety of dogs under a wide variety of conditions, and for a wide variety of purposes.

Animal training systems are known which have an adjustable intensity selected by an adjustable intensity control which are typically limited by a relatively few number of correction levels, for example, no correction, very low, low medium, high and very high. However, this relatively few number of correction levels is not adequate for the existing wide variety of dogs with their attendant differences in coat, temperament, etc., under a wide variety of training conditions; nor is it adequate for a variety of other animals. Further, the receivers are not programmable to respond differently to different type of signals.

An animal training system is known which reports the strength of the detected electromagnetic signal to the control unit, and which is programmed to determine a degree of correction to be applied to the animal in response to the separation between the animal and the transmitter. However, this system has relatively few correction levels which it can program, and therefore does not address the need for a relatively large number of correction levels.

What is needed in the art is an animal training system with a relatively high number of configurable correction settings, and preferably, where the correction settings have more than one adjustable parameter.

SUMMARY OF THE INVENTION

The present invention provides an animal training system in which a large number of correction levels are programmed, and which such programming is accomplished by adjusting both an amplitude and a rate, or number, of correction pulses The invention comprises, in one form thereof, a receiver for an animal training system which includes a stimulation unit for providing at least one stimulus having a quantity of energy pulses and a stimulus pulse width; and a controller connected to the stimulation unit. The controller receives at least one transmitted signal and assigns amplitude information and rate information to at least one correction signal. The stimulation unit receives the at least one correction signal and outputs a corresponding stimulus having the quantity of energy pulses corresponding to the rate information. The stimulus has the stimulus pulse width corresponding to the amplitude information.

The invention comprises, in another form thereof, an animal training system which includes at least one transmitter transmitting at least one transmitted signal, and a receiver in electrical communication with the at least one transmitter. The receiver includes a stimulation unit for providing at least one stimulus having a quantity of energy pulses and a stimulus pulse width; and a controller connected to the stimulation unit. The controller receives at least one transmitted signal and assigns amplitude information and rate information to at least one correction signal. The stimulation unit receives the at least one correction signal and outputs a corresponding stimulus having the quantity of energy pulses corresponding to the rate information. The stimulus has the stimulus pulse width corresponding to the amplitude information.

The invention comprises, in yet another form thereof, a method of configuring correction levels in a receiver for an animal training system, including the steps of: connecting the receiver to a programming unit; selecting one of a indoor correction level and an outdoor correction level; choosing an amplitude setting for the correction level; and selecting a rate setting for the correction level.

The invention comprises, in yet another form thereof, a receiver for an animal training system which includes a stimulation unit for providing at least one stimulus having a quantity of energy pulses and a stimulus pulse width; and a controller connected to the stimulation unit. The controller receives a first transmitted signal and a second transmitted signal, and the controller is preprogrammed to provide a first correction signal corresponding to the first transmitted signal and a second correction signal corresponding to the second transmitted signal. The stimulation unit for receives the first correction signal and outputs a corresponding first stimulus, and also receives the second correction signal and outputs a corresponding second stimulus. The first stimulus and second stimulus differs by at least one of the quantity of energy pulses and the stimulus pulse width.

The invention comprises, in yet another form thereof, a receiver for an animal training system which includes a stimulation unit for providing at least one stimulus having a quantity of energy pulses and a stimulus pulse width; and a controller connected to the stimulation unit. The controller receives a first transmitted signal triggered by a first event and a second transmitted signal triggered by a second event. The controller is preprogrammed to provide to the stimulation unit a first correction signal corresponding to the first transmitted signal and a second correction signal corresponding to the second transmitted signal, where the first correction signal is different than the second correction signal.

An advantage of the present invention is that it provides a relatively large number of configurable correction settings.

Another advantage is that the receiver of the present invention can be programmed to configure both an amplitude and a rate, corresponding to a pulse width and a number of pulses, for the correction setting.

Yet another advantage of the present invention is that it is adaptable to a wide variety of animals.

Yet another advantage of the present invention is that it is adaptable to a wide variety of animal training systems.

Yet another advantage of the present invention is that it is adaptable to a wide variety of animal training conditions.

Yet another advantage is that the receiver of the present invention can be programmed to provide different types of correction for different types of transmitted signals.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 2 is a schematic view of an embodiment of a containment type animal training system according to the present invention;

FIG. 3 is a schematic view of an embodiment of an avoidance type animal training system according to the present invention;

FIG. 10 is a table view of values of the parameters of the timing diagram of FIG. 9, and with different amplitude and rate settings, under different load conditions (HP probe and 10 kΩ);

FIG. 12 is a perspective fragmentary detail of the programming unit and receiver of FIG. 11, shown with the receiver connected to the serial interface of the programming unit;

FIG. 13 is a bottom view of the receiver of FIG. 11, showing particularly the serial interface of the receiver, and taken along section line 13-13 of FIG. 11;

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figure 1:
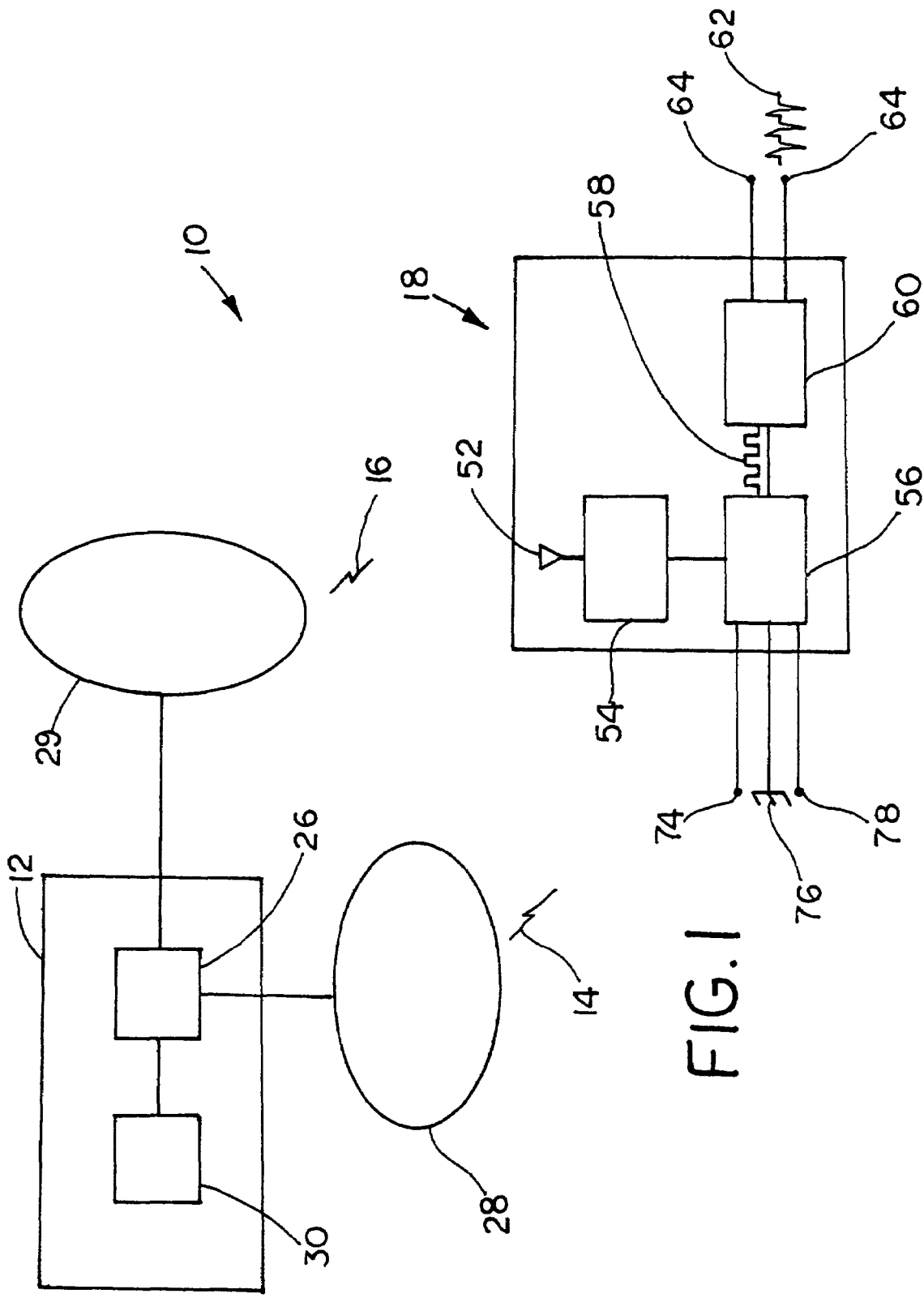
FIG. 1 is an electrical schematic view of an embodiment of an animal training system according to the present invention.

Referring now to the drawings, and more particularly to FIG. 1, there is shown an animal training system 10 which generally includes at least one transmitter 12 transmitting at least one transmitted signal 14, 16. A receiver 18 is in electrical, typically wireless, communication with transmitter 14.

Figure 4:
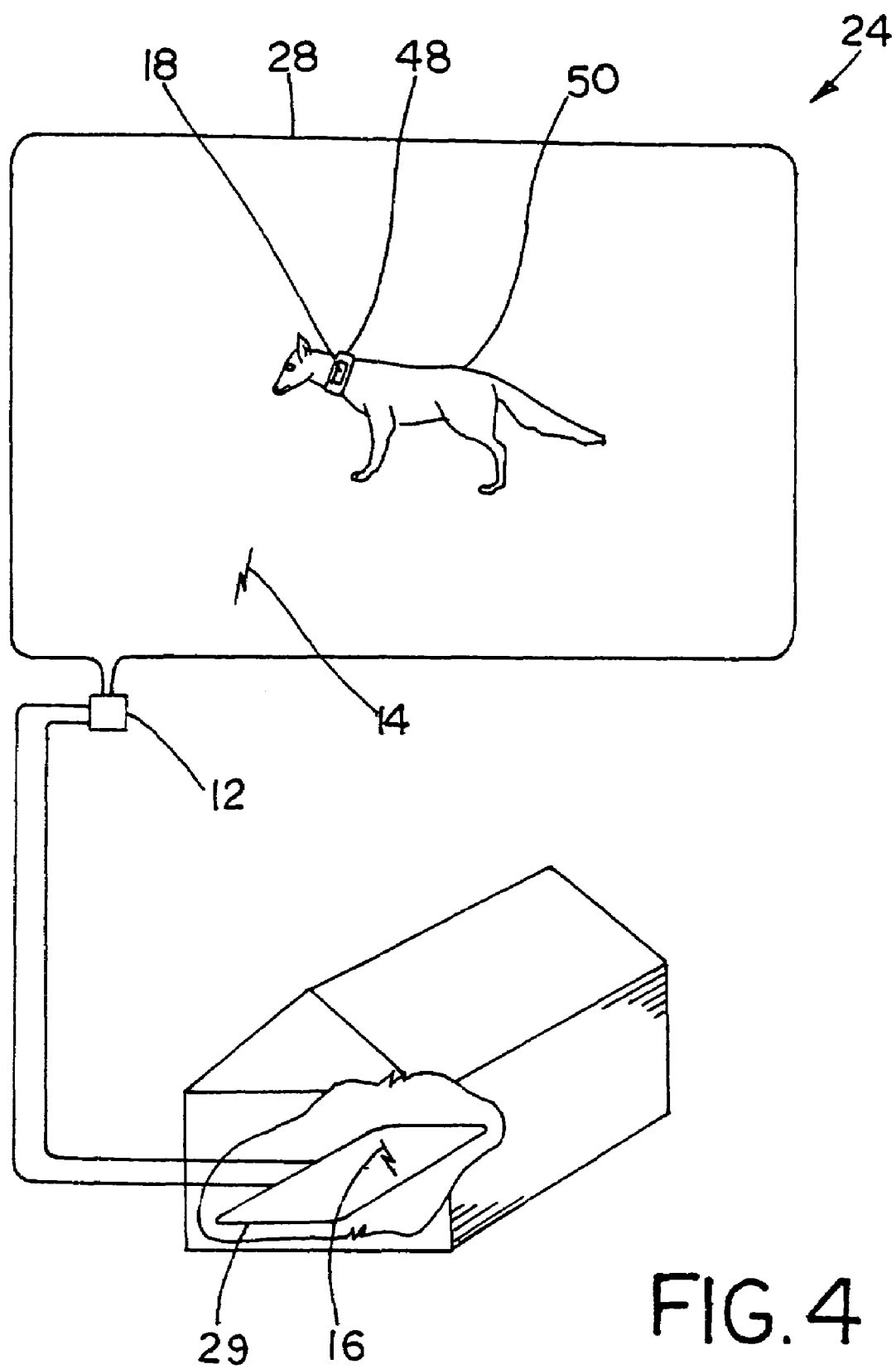
FIG. 4 is a schematic view of an embodiment of a containment type animal training system which includes two containment areas, one outdoor and one indoor according to the present invention.

Examples of animal training system include a single containment loop system 20 (FIG. 2), an avoidance type animal training system 22 (FIG. 3), a multiple containment loop system 24 (FIG. 4), and/or some combination thereof, or even remote training systems or bark control collars. Transmitter 12 can include a modulator 26 for energizing at least one antenna 28, 29, and a controller 30 connected to modulator 26. Transmitter 12 can include other elements such as pushbutton switches, an enunciator(s), indicator lights and the like. Avoidance system 22 includes an avoidance type antenna 32, which is typically different than a containment wire loop antenna, and which creates avoidance zone 34. Avoidance system 22 can transmit an avoidance type transmitted signal 35.

Figure 5:
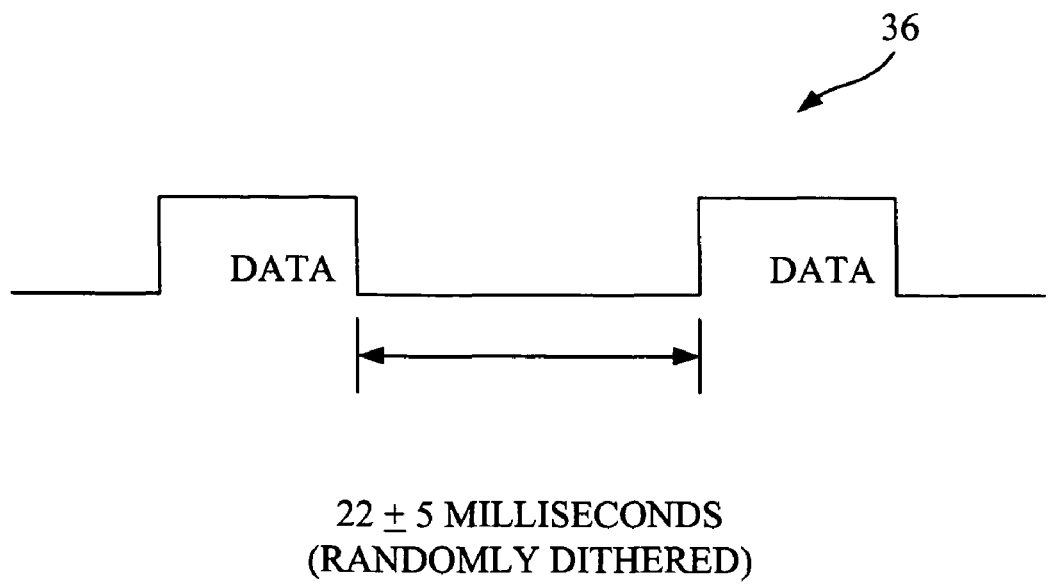
FIG. 5 is a timing diagram view of an embodiment of transmission data packets according to the present invention.
Figure 6:
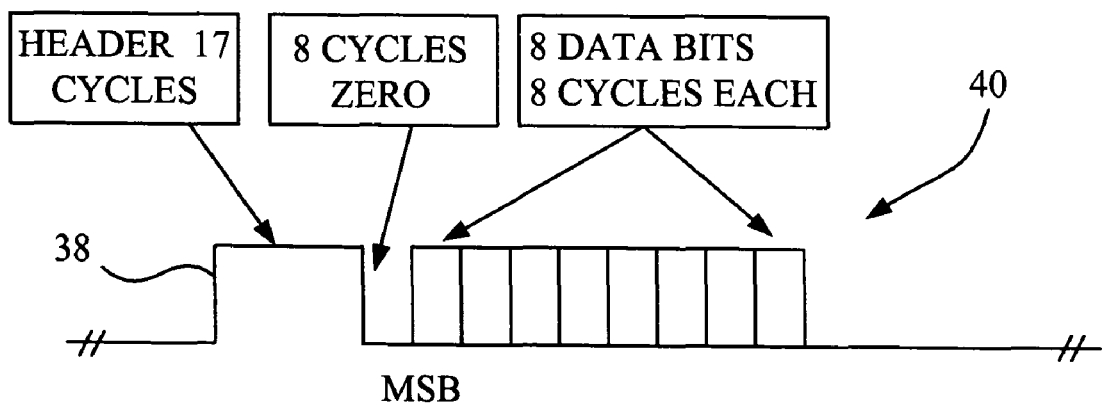
FIG. 6 is a timing diagram view of an embodiment of transmitted signals used in the transmission data packets of FIG. 5.

The signal or signals 14, 16, 35 emitted by antenna(s) 28, 29, 32 can include use on/off keying with 7.5 kHz and 10.7 kHz carrier frequencies, although other keying arrangements and carrier frequencies are possible. As shown in FIG. 5, signal packets 36 of signals 14, 16, 35 can be spaced by 22±5 milliseconds randomly dithered. Each data bit can contain eight carrier cycles. As shown in FIG. 6, a header 38 (of signals 14, 16, 35) of seventeen carrier cycles followed by eight cycles of zero is used to identify the start of an 8 bit data block 40. An entire signal packet 36 takes eighty-nine carrier cycles. The total temporal length of a packet will depend on the carrier frequency.

Figure 7:
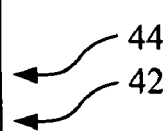
FIG. 7 is a table view showing possible embodiments of bit assignments for indoor and outdoor signals according to the present invention.

The present invention can include indoor type signals 42 and/or outdoor type signals 44 (FIG. 7), where the difference in signal types can signal different correction levels 46 (FIG. 8) in receiver 18, for example. That is, an outdoor signal type may stimulate a higher correction level in receiver 18 as the repercussion of an animal leaving a yard may be greater (wandering into traffic, for example) than the repercussions of an animal leaving a containment area within a building, or entering an avoidance zone in a building, but staying in the building because of physical barriers. The signal radiated by avoidance antenna 32 may be an indoor type signal, as may be the signal radiated by second containment wire loop 29 in FIG. 4, although this is not necessarily the case, and either indoor or outdoor signal types are possible. As previously mentioned, the indoor or outdoor signals 42, 44 can be digital signals or words created using on/off keying by transmitter 14, and having coded therewithin signal type, and/or other attributes, for example.

Figure 8:
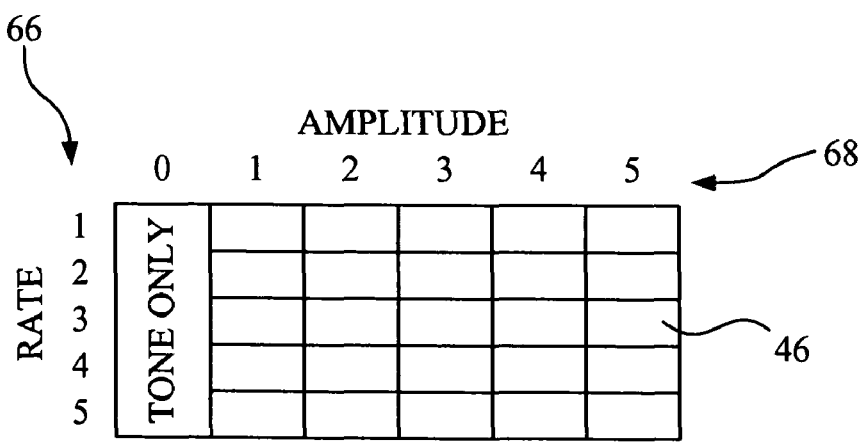
FIG. 8 is a table view showing possible rate and amplitude settings for indoor and outdoor signals according to the present invention.

Receiver 18 can be connected to collar 48 which is worn by an animal 50, for example, although other configurations are possible. Receiver 18 can include a receiver antenna 52 to receive a transmitted signal 14, 16 (from transmitter 14 through antenna(s) 28, 29, 32), where antenna 52 is connected to a demodulator 54 which is connected to a receiver controller 56. Controller 56 receives at least one transmitted signal 14, 16, 35, and outputs at least one correction signal 58, which includes amplitude information and rate information as shown in FIG. 8. If dog 50 approaches too closely to the geographical area defined by containment wire loop antenna 28, this can be considered a first event wherein transmitted signal 14 triggers a first correction signal. Similarly, if dog 50 approaches too closely to the geographical area defined by avoidance zone 34, this can be considered a second event wherein transmitted signal 35 triggers a second correction signal different from the first correction signal.

Figure 9:
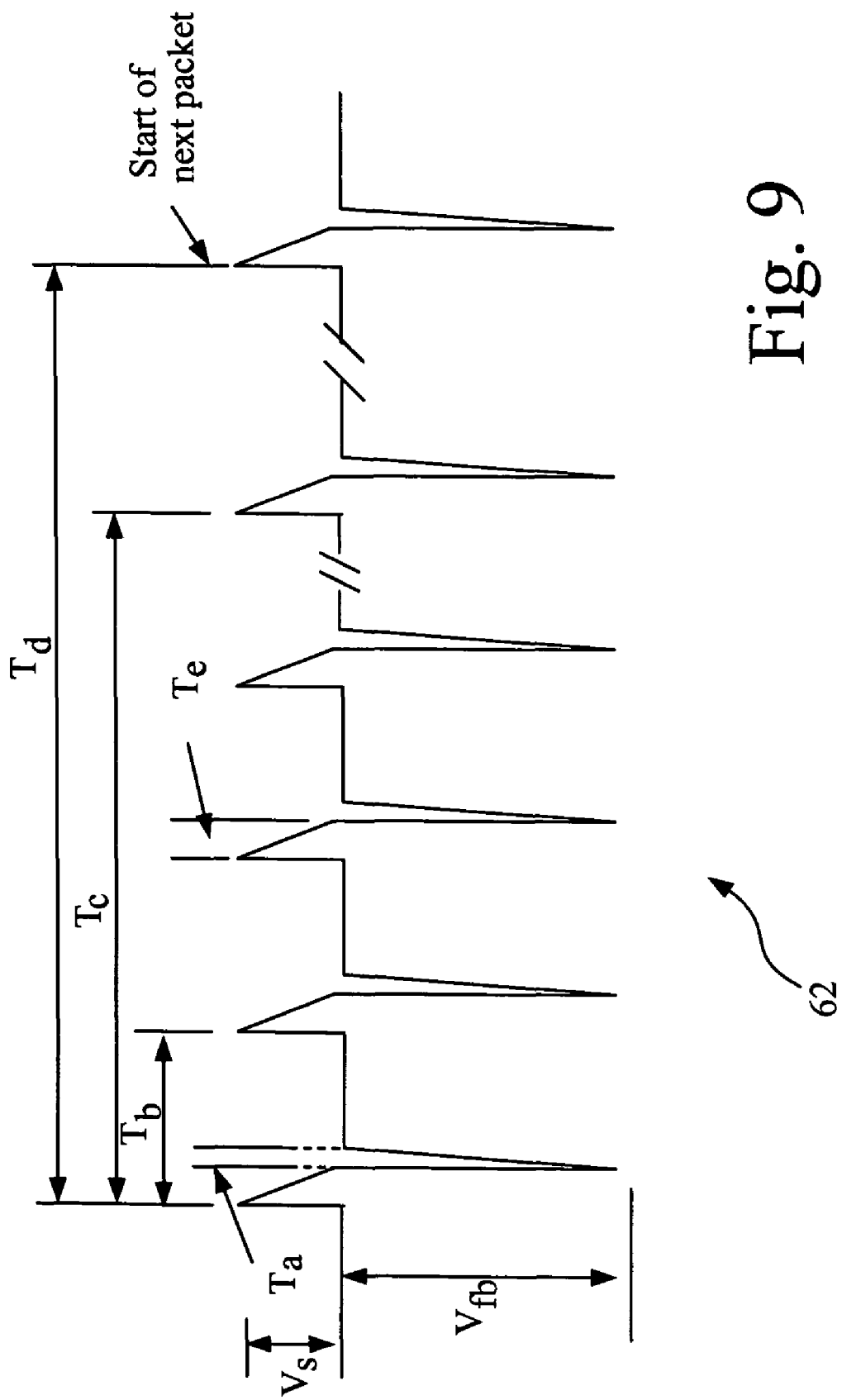
FIG. 9 is a timing diagram view of an embodiment of a stimulus signal according to the present invention.

A stimulation unit 60 is connected to controller 56. Stimulation unit 60 receives at least one correction signal 58 and provides at least one stimulus 62, as shown particularly in FIGS. 9 and 10, having a predetermined quantity of energy pulses corresponding to the rate information, and where each pulse has a predetermined stimulus pulse width corresponding to the amplitude information. Stimulation unit 60 can include an electrical stimulus switch which is connected to controller 56, and which electrical stimulus switch in turn energizes the primary winding of a transformer, which is connected to a voltage source, to thereby energizes the secondary winding of the same transformer which are connected to electrodes 64 which are in contact with the animal's neck and connected to the secondary wind. Stimulation unit 60 can further include a tone switch which is connected to and activates an enunciator; and/or a vibration switch which is connected to and activates a vibrational element. An example of rate information is shown at 66 in FIGS. 8 and 10; amplitude information is shown at 68 in FIGS. 8 and 10; the quantity of energy pulses is shown at 70 in FIG. 10; and the stimulus pulse width is shown at 72 in FIG. 10.

For example, and as shown particularly in FIGS. 8 and 10, there can be six amplitude settings (one being 0 for tone-only), and five rate settings, although different amplitude and rate settings are possible. For example, a rate setting of 2 corresponds to three pulses whereas a rate setting of 5 corresponds to ten pulses (see FIG. 10). Receiver 18 can be programmed so that there is a separate set of settings for the correction delivered when indoor signal 42 is decoded. The amplitude setting defines the pulse width of the shock, while the rate setting defines the rate administered during the beep period, and the corresponding number of pulses. Stimulation pulses can occur while the piezo (speaker or enunciator) is oscillating (to produce a beep). Stimulation pulses can be evenly spaced (±~20%) throughout the duration of the beep. Examples of stimulation profiles when receiver 18 is powered by a 3.0 V power supply with the two specified load conditions (HP probe and 10 kΩ) are shown in FIG. 10; however, the electrical load presented to electrodes 64 by the skin/fur of animal 50 is highly variable and dependent on such factors as breed, humidity, skin dryness, etc. Further, the skin/fur's electrical impedance can also be a function of the stimulus voltage as a relatively high energy pulse voltage can cause ionizing effects at the electrode's contact area, which breaks down the skin/fur's electrical impedance. Consequently, the stimulation profiles shown in FIG. 10 can be modified by the actual load conditions provided by a particular animal's skin/coat; however, the data using the 10 kΩ load is at least somewhat representative of actual conditions.

Transmitted signals 14, 16, 35 can be outdoor type signal 44, indoor type signal 42 and/or some combination thereof, and receiver 18 can provide correspondingly different stimuli depending on the rate and amplitude selected from FIG. 8, for example, for the respective signal type. Consequently a first stimulus can be different than a second stimulus by a quantity of energy pulses and/or a stimulus pulse width, which allows a selectable different level of correction outputted by receiver 18, as required by the trainer, training system and/or training conditions. Further, receiver 18 can be programmed to respond to multiple transmitters, as may be the case when receiver 18 is used with both containment loop systems 20 or 24, and/or avoidance system 22.

Receiver 18 can further include a communication interface 74, 76 connected to controller 56, where communication interface 74, 76 is used for programming controller 56 to provide a respective correction signal 58 corresponding to a respective transmitted signal. Receiver 18 can further include a + terminal at 78 for connection to the positive terminal of a battery, where terminal 76 doubles as a − terminal for connection to the negative terminal of a battery. Communication interface 74, 46 can be a serial interface (two terminal).

Figure 11:
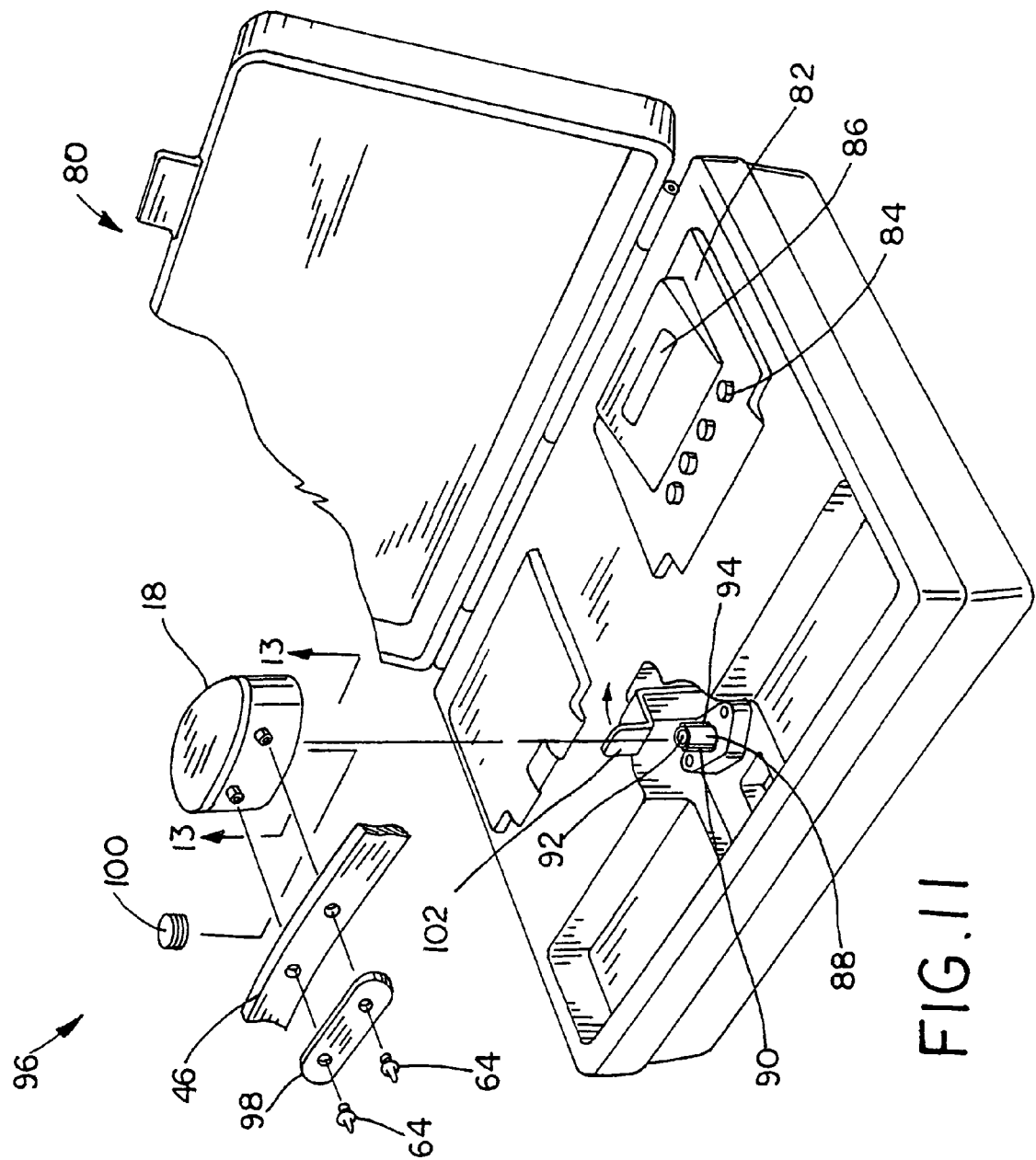
FIG. 11 is a perspective, exploded fragmentary view of an embodiment of programming unit of the animal training system, shown in conjunction with a receiver collar assembly according to the present invention.
Figure 14:
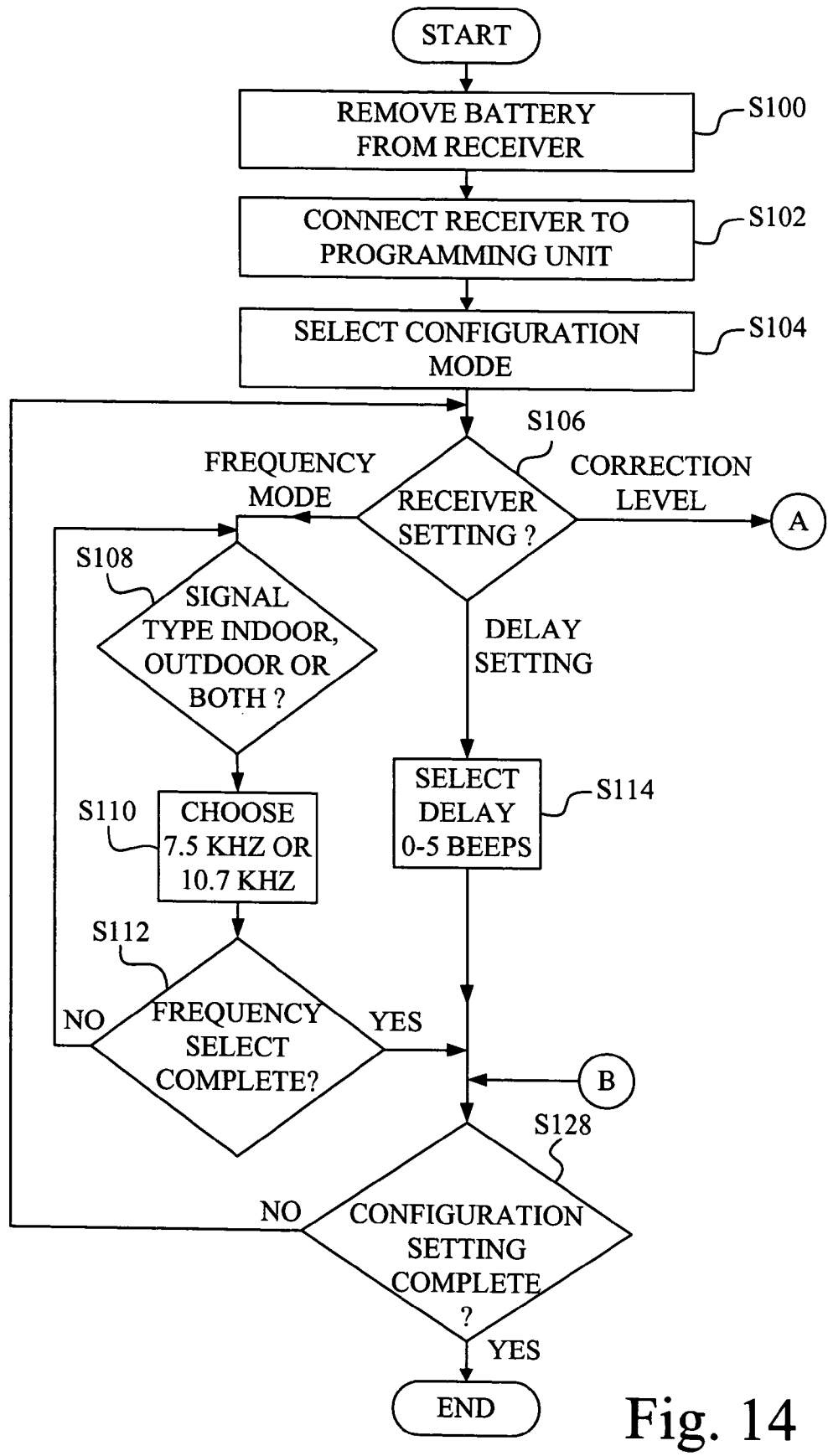
FIG. 14 is a flowchart view of an embodiment of a method according to the present invention.
Figure 15:
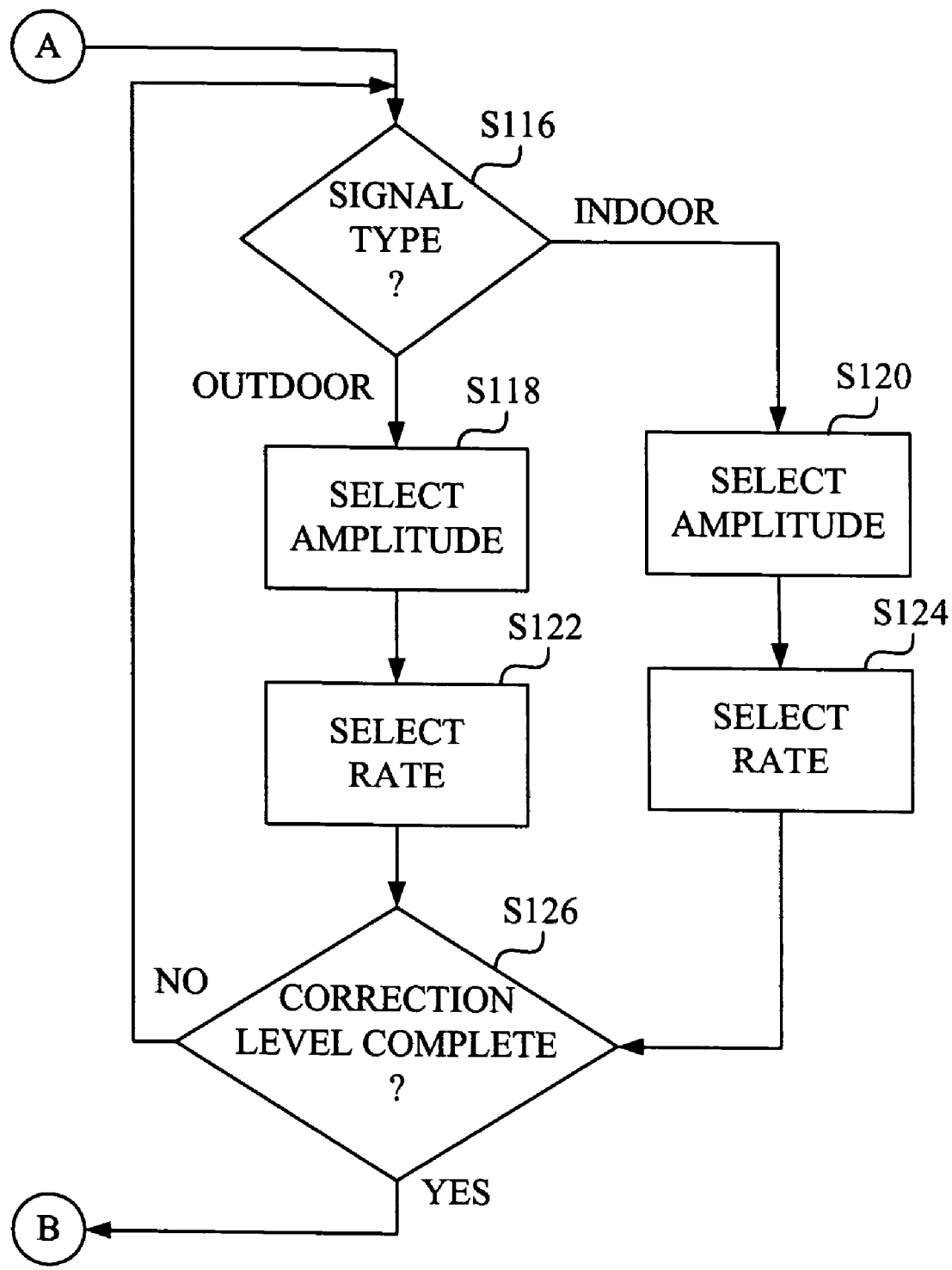
FIG. 15 is a flowchart view of a continuation of the method of FIG. 14.

Animal training system 10 can include a programming unit 80 (FIGS. 11 and 12) for configuring amplitude information 68 and rate information 66 for a respective correction signal 58, within receiver 18. Programming unit 80 can include user interface 82 with pushbuttons 84 and display 86 connected to a programming unit controller (not shown). The programming unit controller is connected to post 88, which has post terminals 90, 92 and 94 corresponding to receiver terminals 74, 76 and 78, respectively.

To connect receiver 18 to programming unit 80, receiver 18 must be disassembled from collar assembly 96 including collar 48, retaining strip 98 and electrodes 64. Additionally, battery 100 is removed from receiver 18 thereby exposing receiver terminals 74, 76, 78 for connection to programming unit 80 post terminals 90, 92, 94. Retaining clip 102 holds receiver 18 to programming unit 80 during programming of receiver 18.

A method of configuring correction levels 46 in a receiver 18 for an animal training system 10, 20, 22, 24, which includes the steps of: removing battery 100 from receiver 18 (S100), connecting receiver 18 to programming unit 80 (S102); selecting a configuration mode (S104) using user interface 82; selecting one of frequency setting mode, delay setting mode or correction level mode (S106); if frequency setting mode is selected then the transmitted frequencies for indoor and/or outdoor type signals can be set in steps S108, S110 and S112; if delay setting mode is selected then delay can be set in step S114; if correction level mode is selected then one of a indoor or outdoor signal is selected corresponding to a respective indoor or outdoor correction level (S116); choosing an amplitude setting for a corresponding correction level (S118 and S120); and selecting a rate setting for a corresponding correction level (S122 and S124). In step 126, a determination is made if the correction level settings are complete; and in step 128, a determination is made if all configuration mode settings are complete.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A receiver for an animal training system, comprising:
   a stimulation unit for providing at least one stimulus having a quantity of energy pulses and a stimulus pulse width; and
   a controller connected to said stimulation unit, said controller for receiving at least one transmitted signal and for assigning amplitude information and rate information to at least one correction signal, said stimulation unit for receiving said at least one correction signal and outputting a corresponding said stimulus having said quantity of energy pulses corresponding to said rate information, and said stimulus having said stimulus pulse width corresponding to said amplitude information.

2. The receiver of claim 1, wherein said at least one transmitted signal comprises a first transmitted signal and a second transmitted signal, said stimulation unit providing a first stimulus corresponding to said first transmitted signal and a second stimulus corresponding to said second transmitted signal.

3. The receiver of claim 2, wherein said first transmitted signal is a outdoor type signal and said second transmitted signal is an indoor type signal.

4. The receiver of claim 2, wherein said first stimulus is different than said second stimulus.

5. The receiver of claim 4, wherein said first stimulus is different than said second stimulus by at least one of said quantity of energy pulses and said stimulus pulse width.

6. The receiver of claim 1, further including a communication interface connected to said controller, said communication interface for programming said controller to provide a respective said correction signal corresponding to a respective transmitted signal.

7. The receiver of claim 6, wherein said communication interface is a serial interface.

8. The receiver of claim 7, wherein said receiver includes a plurality of battery terminals, said serial interface uses at least one of said plurality of battery terminals.

9. The receiver of claim 1, further including a collar connected to said receiver.

10. An animal training system, comprising:
    at least one transmitter transmitting at least one transmitted signal;
    a receiver in electrical communication with said at least one transmitter, said receiver including:
       a stimulation unit for providing at least one stimulus having a quantity of energy pulses and a stimulus pulse width; and
       a controller connected to said stimulation unit, said controller for receiving said at least one transmitted signal and for assigning amplitude information and rate information to at least one correction signal, said stimulation unit for receiving said at least one correction signal and outputting a corresponding said stimulus having said quantity of energy pulses corresponding to said rate information, and said stimulus having said stimulus pulse width corresponding to said amplitude information.

* * * * *